US008233403B2

(12) United States Patent
Yin

(10) Patent No.: US 8,233,403 B2
(45) Date of Patent: Jul. 31, 2012

(54) METHOD AND ELEMENT FOR DETERMINING MEASUREMENT TIME OF INTER-FREQUENCY MEASUREMENT AND INTER-FREQUENCY MEASUREMENT METHOD

(75) Inventor: Liyan Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 499 days.

(21) Appl. No.: 11/949,886

(22) Filed: Dec. 4, 2007

(65) Prior Publication Data

US 2008/0123570 A1    May 29, 2008

Related U.S. Application Data

(63) Continuation of application No. PCT/CN2006/001434, filed on Jun. 23, 2006.

(30) Foreign Application Priority Data

Jun. 24, 2005   (CN) .......................... 2005 1 0077773

(51) Int. Cl.
    *H04L 5/14*   (2006.01)
(52) U.S. Cl. ....................................... 370/252; 370/276
(58) Field of Classification Search .................. 370/312, 370/329, 331, 332, 335, 336, 343, 252, 275, 370/276, 277–280, 281, 294, 295, 296, 310, 370/314, 436, 478, 504; 455/436, 438–444
    See application file for complete search history.

(56) References Cited

U.S. PATENT DOCUMENTS

| 6,212,368 | B1 * | 4/2001 | Ramesh et al. ............ 455/277.2 |
| 6,459,689 | B1 * | 10/2002 | Czaja et al. .................. 370/331 |
| 6,891,852 | B1 * | 5/2005 | Cloutier et al. ............... 370/468 |
| 6,978,138 | B2 * | 12/2005 | Japenga et al. .............. 455/436 |
| 7,133,382 | B2 * | 11/2006 | Steudle .......................... 370/331 |
| 7,224,977 | B2 * | 5/2007 | Cavalli et al. ............. 455/452.1 |
| 7,313,116 | B2 * | 12/2007 | Lee et al. ...................... 370/335 |

(Continued)

FOREIGN PATENT DOCUMENTS

CN            1406446          3/2003

(Continued)

OTHER PUBLICATIONS

"Universal Mobile Telecommunications System (UMTS); Physical layer; Measurements (FDD) (3GPP TS 125 215 version 6.3.0 Release 6); ETSI TS 125 215" ETSI Standards, LIS, vol. 3,-R1, No. V6.3.0, Jun. 1, 2005, pp. 1-19, XP014030546.
European Search Report dated May 8, 2008; Application No./Patent No. 06761315.8-1525 PCT/CN2006001434.

(Continued)

*Primary Examiner* — Chi Pham
*Assistant Examiner* — Prince A Mensah
(74) *Attorney, Agent, or Firm* — Slater & Matsil, L.L.P.

(57) ABSTRACT

The invention provides a method and an element for determining a measurement time of an inter-frequency measurement, used for the dual mode UE supporting FDD mode and TDD mode in the FDD mode to perform the inter-frequency measurement to the TDD cell. If a whole timeslot is found within the measurement time, the PCCPCH mapped from the broadcast channel bearing the system information being located in the timeslot, the measurement time is taken as the valid measurement time for measuring the measurement performance. Accordingly, a method for measuring inter-frequency is also provided. A credible valid measurement time and a credible inter-frequency measurement may be realized according to the invention. Thus, the accuracy for evaluating the measurement performance and the measurement accuracy may be improved.

20 Claims, 5 Drawing Sheets

U.S. PATENT DOCUMENTS

| | | | | |
|---|---|---|---|---|
| 7,509,097 | B2 * | 3/2009 | Irie et al. | 455/67.13 |
| 2002/0006119 | A1 * | 1/2002 | Steudle | 370/329 |
| 2004/0022217 | A1 * | 2/2004 | Korpela et al. | 370/335 |
| 2005/0094561 | A1 * | 5/2005 | Raaf | 370/235 |
| 2005/0213583 | A1 * | 9/2005 | Lee et al. | 370/395.5 |
| 2005/0277416 | A1 * | 12/2005 | Tolli et al. | 455/436 |
| 2006/0002323 | A1 * | 1/2006 | Hildebrand et al. | 370/321 |
| 2007/0053336 | A1 * | 3/2007 | Petrovic et al. | 370/343 |

FOREIGN PATENT DOCUMENTS

| | | |
|---|---|---|
| CN | 1433650 | 7/2003 |
| CN | 1488228 A | 4/2004 |
| EP | 1 137 203 | 9/2001 |
| EP | 1 467 586 | 10/2004 |
| FR | EP 1091515 * | 11/2001 |
| WO | 0117305 A1 | 3/2001 |
| WO | 0141492 A1 | 6/2001 |
| WO | 01/65882 | 9/2001 |
| WO | 02/39758 | 5/2002 |
| WO | WO2004/100588 | 11/2004 |

OTHER PUBLICATIONS

3GPP TS 25.133 V6.9.0: "3rd Generation Partnership Project; Technical Specification Group Radio Access Network; Requirements for support of radio resource management (FDD)(Release 6)", dated Mar. 2005,total 177 pages.

3GPP TS 25.221 V6.3.0: "3rd Generation Partnership Project; Technical Specification Group Radio Access Network; Physical channels and mapping of transport channels onto physical channels (TDD) (Release 6)", dated Mar. 2005, total 100 pages.

Office action issued in corresponding Chinese patent application No. 200680012820.6, dated Jul. 24, 2009,and English translation thereof, total 13 pages.

Office action issued in corresponding Chinese patent application No. 200680012820.6, dated Sep. 7, 2010,and Partial English translation thereof, total 14 pages.

Written Opinion issued in corresponding PCT application No. PCT/CN2006/001434, dated Oct. 19, 2006, total 3 pages.

Third Chinese Office Action, Chinese Application No. 200680012820.6, Mailing Date: Sep. 21, 2011, 13 pages.

Chinese Rejection Decision and Translation received in Chinese Patent Application No. 200680012820.6, mailed May 3, 2012, 16 pages.

* cited by examiner

METHOD AND ELEMENT FOR DETERMINING MEASUREMENT TIME OF INTER-FREQUENCY MEASUREMENT AND INTER-FREQUENCY MEASUREMENT METHOD

The present application is a continuation of PCT application PCT/CN2006/001434, filed on Jun. 23, 2006, entitled "A METHOD AND A DEVICE FOR DETERMINING THE MEASUREMENT TIME OF THE INTER-FREQUENCY MEASUREMENT AND AN INTER-FREQUENCY MEASUREMENT METHOD", which is incorporated by reference herein in its entirety. The PCT application claims the benefits of CN Application No. 200510077773.0 filed on Jun. 24, 2005, titled "METHOD FOR DETERMINING MEASUREMENT TIME OF INTER-FREQUENCY MEASUREMENT AND INTER-FREQUENCY MEASUREMENT METHOD", which is incorporated herein by reference in its entirety.

FIELD OF THE INVENTION

The invention relates to a technology of User Equipment inter-frequency measurement in the 3rd Generation (3G) mobile communication system, and particularly to a method and an element for determining measurement time of the inter-frequency measurement and an inter-frequency measurement method thereof.

BACKGROUND OF THE INVENTION

Universal Mobile Telecommunications System (UMTS) is a 3G mobile communication system using Wideband Code Division Multiple Access (WCDMA) air interface technology, and is mainly developed in WCDMA/GSM (Global System for Mobile Communications) global standardization organization for Third Generation Partnership Project (3GPP).

In the 3GPP UMTS standards, depending on whether a Radio Resource Control (RRC) connection has been established, a User Equipment (UE) may be classified into Idle mode and RRC Connected mode. The UE which has not established the RRC connection with UMTS Universal Terrestrial Radio Access Network (UTRAN) is in Idle mode, and the UE in this mode may only be identified with Non-Access Stratum (NAS) identification, for example, be identified with International Mobile Subscriber Identity (IMSI); and when the UE which has established the RRC connection with UTRAN is in RRC Connected Mode, a Radio Network Temporary Identity (RNTI) allocated for the UE in this mode is taken as an identification on a public transport channel for the UE.

And the UE in RRC Connected Mode may be further separated into different states depending on the levels of the RRC connection and the transport channel types available for the UE: the UE in CELL_PCH state, CELL_FACH state and CELL_DCH state may be identified at cell level, and the UE in URA_PCH state may be identified at UTRAN Register Area (URA) level. A dedicated physical channel is allocated for the UE in CELL_DCH state, and the UE may use the dedicated transport channel, a shared channel and their combination. The UE in CELL_FACH state continuously monitors a Forward Access Channel (FACH) in downlink and a default Reverse Access Channel (RACH) is allocated for the UE in uplink. The UE in CELL_PCH state and URA_PCH state uses Discontinuous Reception (DRX) approach for monitoring a Page Channel (PCH) via an associated Page Indicator Channel (PICH), and the UE in these two states has no uplink activity.

In the 3GPP UMTS standards, when a UE is in different modes and states, it will measure an inter-frequency cell in response to the received measurement control information or system information and the receiving quality of the cell in which the UE is located to perform cell reselection and cell switching etc. For the UE in Idle, CELL_PCH, URA_PCH and CELL_FACH states, the conditions for triggering inter-frequency cell measurement are received system information and the receiving quality of the current cell in which the UE is located; while for the UE in CELL_DCH state, the condition for triggering inter-frequency cell measurement is the measurement control information sent by the system. In general, a UE without dual receivers cannot simultaneously receive and decode signals of two different frequencies, so the UE will interrupt the signal reception in the current cell during performing inter-frequency cell measurement.

The 3G mobile communication system introduces a concept of broadcast and multicast for efficient utilization of mobile communication network resources, and the multicast and broadcast service is a technology for transmitting the same data from one data source to multiple destinations. Therefore, WCDMA/GSM global organization for standardization 3GPP puts forward Multimedia Broadcast/Multicast Service (MBMS). The MBMS refers to providing a point-to-multipoint service for transmitting the same data from one data source to multiple users in a mobile communication network, so as to realize network resource sharing and improve network resource utilization, especially the utilization of air interface resources.

The data transmission of the MBMS service between the UE and the UTRAN may be divided into two modes: Point to Point (PTP) and Point to Multipoint (PTM). The PTP mode is used for MBMS multicast mode. The UE of RRC Connected Mode in multicast mode receives control information via a Dedicated Control Channel (DCCH) and receives service information via a Dedicated Service Channel (DTCH). While the PTM mode is used for MBMS broadcast or multicast mode, the UE in this mode receives data information via an MBMS point-to-multipoint Traffic Channel (MTCH) and receives control information via an MBMS point-to-multipoint Control Channel (MCCH).

The cells monitored by the UE may be classified into the following three categories:
1) Active Set cell: the UE information is transmitted in these cells; the UE only measures the Active Set cells contained in a list of cell information;
2) Monitor Set cell: the cells not contained in the Active Set cells but contained in the list of cell information are monitor Set cells;
3) Detection Set cell: the cells neither contained in the list of cell information nor contained in the Active Set cells, but may be detected by the UE are Detection Set cells.

When a dual mode UE supporting WCDMA Frequency Division Duplex (FDD) mode and WCDMA Time Division Duplex (TDD) mode in CELL_FACH state performs inter-frequency measurement to a TDD cell in FDD mode, in order to identify a new TDD cell or measure Received Signal Code Power (RSCP) of a Primary Common Control Physical Channel (PCCPCH) for TDD cell reselection between systems, it will position a frame whose System Frame Number (SFN) satisfies the following formula and perform TDD cell inter-frequency measurement in the frame.

$$\text{SFN div } N = C\_RNTI \bmod M\_REP + n \times M\_REP \qquad \text{(formula 1)}$$

In which:

N represents the number of 10 ms frames of Transmission Timing Interval (TTI) of the FACH with a maximal TTI on an Secondary Common Control Physical Channel (SCCPCH) bearing non-MBMS logical channel monitored by the dual mode UE;

M_REP represents the measurement interval cycle period, $M\_REP=2^k$; and according to the above formula, the repeat period of the measurement time for N frames is N×M_REP frames; k is the coefficient of FACH Measurement interval cycle period, which may be read from the information element "FACH measurement occasion info" contained in the system information 11 or 12;

Cell Radio Network Temporary Identity (C_RNTI) represents the C_RNTI value of the dual mode UE;

n=0, 1, 2 . . . , as long as the SFN is less than its maximum value.

When the dual mode UE supporting WCDMA FDD mode and WCDMA TDD mode in CELL_DCH state performs inter-frequency measurement to a TDD cell in FDD mode, in order to identify a new TDD cell and measure the PCCPCH RSCP for switching TDD cell between systems, it will perform inter-frequency measurement to the TDD cell in a compression mode indicated by the UTRAN, and the technical principle of the compression mode is shown in FIG. 1, i.e. when the UTRAN transmits certain frames (the data transmitted every 10 ms is one frame), the data transmission rate is increased, and the data previously transmitted in 10 ms may be transmitted less than 10 ms, then the saving time will be used to perform inter-frequency measurement for the dual mode UE, but when and how to increase the transmission rate is completely controlled by the UTRAN.

In the prior art, the main process for the dual mode UE supporting WCDMA FDD mode and WCDMA TDD mode in CELL_FACH state performing inter-frequency measurement to the TDD cell in FDD mode is as follows:

1) the UE triggers the inter-frequency measurement for the TDD cell according to the system information and the cell receiving quality;
2) the UE performs inter-frequency measurement to the TDD cell within the measurement time calculated through the Formula 1 (for example, when the UE receives the MBMS PTM service, it will interrupt the measurement to ensure demodulation performance of the received MBMS, so the measurement time will not reach the measurement time calculated through the Formula 1);
3) the physical layer of the UE reports the inter-frequency measurement result to the upper layers of the UE; or identifies a new TDD cell using the inter-frequency measurement result.

In the prior art, the main process for the dual mode UE supporting WCDMA FDD mode and WCDMA TDD mode in CELL_DCH state performing inter-frequency measurement to the TDD cell in FDD mode is as follows:

11) the UE triggers inter-frequency measurement to the TDD cell according to the measurement control information sent from the UTRAN system;
12) the UE performs inter-frequency measurement to the TDD cell within the measurement time indicated by the compression mode sent from the UTRAN;
13) the physical layer of the UE reports the inter-frequency measurement result to the upper layers of the UE; or identifies a new TDD cell using the inter-frequency measurement result.

In summary, when the dual mode UE supporting WCDMA FDD mode and WCDMA TDD mode performs inter-frequency measurement to the TDD cell, the measurement time is calculated through the above-mentioned Formula 1 or indicated by the compression mode sent from the UTRAN, thus the measurement performance is evaluated by taking the measurement time calculated through the Formula 1 or the measurement time indicated by the compression mode sent from the UTRAN as valid measurement time.

But in practice, TDD system is Time Division Duplex mode, the receiving data and the transmitting data need to be respectively born in different timeslots of a same channel (i.e. carrier), and guard intervals (i.e. Guard Period, a time interval existing between timeslots and having a length much shorter than that of a timeslot) are used for separating different timeslots. In the TDD system, the broadcast channel bearing the system information only exists in a dedicated downlink timeslot. And 3G UMTS standard supports two categories of TDD systems.

The first is 3.84 Mcps TDD system, the system frame structure of which is shown in FIG. 2. Each 10 ms frame includes 15 timeslots, and each of the 15 timeslots is transmitted by uplink or downlink. However, among these 15 timeslots, at least one timeslot is allocated as downlink and at least one timeslot is allocated as uplink.

The second is 1.28 Mcps TDD system, each 10 ms frame in the system is divided into two 5 ms subframes, a structure of the subframe is shown in FIG. 3, and each subframe includes 7 timeslots.

In a 3.84 Mcps TDD system, the PCCHPCH mapped from the broadcast channel bearing the system information only exists in one downlink timeslot of one frame; while in a 1.28 Mcps TDD system, the PCCHPCH mapped from the broadcast channel bearing the system information only exists in Timeslot 0 of each subframe.

It is obvious that in a TDD system, the PCCPCH mapped from the broadcast channel bearing system information only exists in a dedicated downlink timeslot, while the inter-frequency measurement for the TDD cell performed by the dual mode UE for identifying a new TDD cell or getting the PCCPCH RSCP measurement result only aims at the timeslot in which the PCCHPCH mapped from the broadcast channel bearing the system information is located. So, when the dual mode UE operating in the FDD mode cannot receive or cannot completely receive the timeslot in which the PCCHPCH mapped from the broadcast channel bearing the system information is located within the measurement time calculated through the Formula 1 or indicated by the compression mode sent from the UTRAN, it is insignificant to directly take the measurement time calculated through the Formula 1 or the measurement time indicated by the compression mode sent from the UTRAN as valid measurement time. Therefore in the prior art, when the dual mode UE operating in the FDD mode performs inter-frequency measurement to the TDD cell, the evaluated measurement performance is not accurate sometimes because the measurement time calculated through the above-mentioned Formula 1 or the measurement time indicated by the compression mode sent from the UTRAN is directly taken as valid measurement time for evaluating the measurement performance while not considering the frame structure of the TDD) system.

SUMMARY OF THE INVENTION

The invention provides a method and an element for determining measurement time of inter-frequency measurement, so as to get a creditable measurement time and improve accuracy of evaluating the measurement performance result.

An embodiment of the invention also provides an inter-frequency measurement method for realizing creditable inter-frequency measurement and improving accuracy of the measurement.

One aspect of the invention provides a method for determining the measurement time of inter-frequency measurement, which may be used for a dual mode UE supporting FDD mode and TDD mode to perform inter-frequency measurement to a TDD cell in the FDD mode, including:

triggering inter-frequency measurement for the TDD cell;

taking a measurement time in which a timeslot is found as a valid measurement time for evaluating a measurement performance, a PCCPCH mapped from a broadcast channel bearing system information being located in the whole timeslot.

Another aspect of the invention provides an inter-frequency measurement method, which may be used for a dual mode UE supporting FDD mode and TDD mode to perform inter-frequency measurement to a TDD cell in FDD mode, including:

determining the measurement time of the inter-frequency measurement for the TDD cell;

searching a timeslot in which the PCCPCH mapped from the broadcast channel bearing the system information is located within the measurement time;

performing the inter-frequency measurement to the TDD cell within the measurement time in which the whole timeslot can be found.

Another aspect of the invention provides an element for determining measurement time of inter-frequency measurement, which may be used for a dual mode UE supporting FDD mode and TDD mode to perform inter-frequency measurement for a TDD cell in FDD mode, including: a measurement time determining unit for determining the measurement time when the UE is triggered to perform the inter-frequency measurement to the TDD cell; and a valid measurement time determining unit, for taking the measurement time as the valid measurement time for evaluating the measurement performance if the whole timeslot in which the PCCPCH mapped from the broadcast channel bearing the system information is located can be found within the measurement time.

The beneficial effects may be achieved by the invention are as follows.

The method for determining measurement time of inter-frequency measurement according to an embodiment of the invention puts forward that when a dual mode UE supporting WCDMA FDD mode and WCDMA TDD mode performs the inter-frequency measurement to a TDD cell in the FDD mode, a measurement time, which may ensure find the whole timeslot in which the PCCPCH mapped from the broadcast channel bearing the system information is located, is taken as the valid measurement time for evaluating the measurement performance. Thus the accuracy for evaluating the measurement performance may be improved based on the valid measurement time.

Accordingly, the inter-frequency measurement method according to the invention also performs TDD cell inter-frequency measurement within the measurement time where the whole timeslot in which the PCCPCH mapped from the broadcast channel bearing the system information is located may be found, thus the inter-frequency measurement for the TDD cell performed by the dual mode UE in FDD mode become credible.

DETAILED DESCRIPTION OF THE INVENTION

An embodiment for determining measurement time of inter-frequency measurement of the invention is as follows: when a dual mode UE supporting FDD mode and TDD mode in FDD mode performs an inter-frequency measurement to a TDD cell, considering the frame structure of the TDD system, a measurement time including the whole timeslot in which the PCCPCH mapped from the broadcast channel bearing the system information is located is taken as a valid measurement time for evaluating the measurement performance, so as to make a evaluated measurement performance more accurate.

Figure 1:
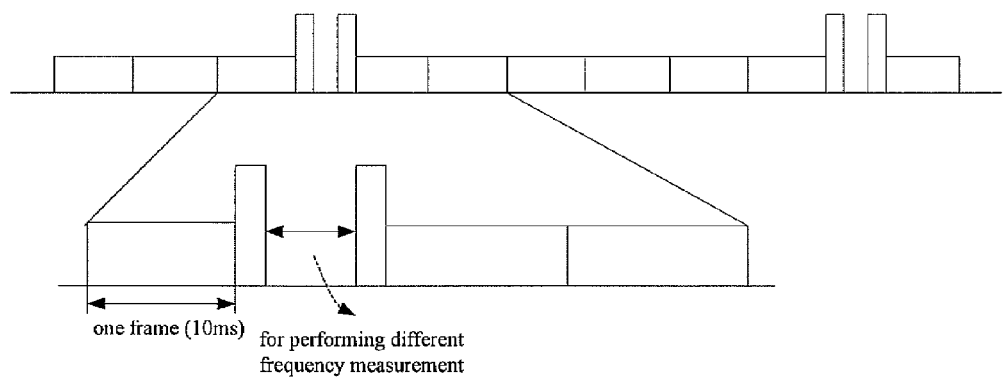
FIG. 1 is a schematic diagram illustrating the technical principle of the conventional compression mode.
Figure 2:
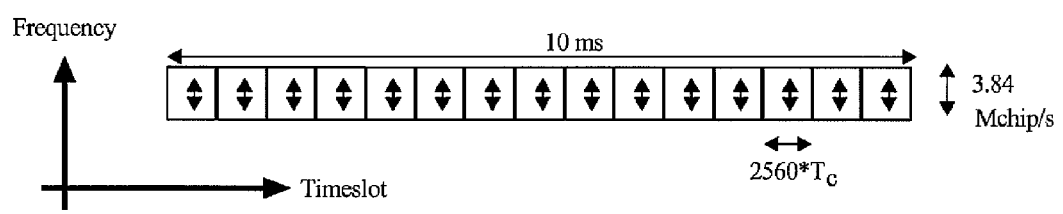
FIG. 2 is a schematic diagram illustrating the frame structure of the conventional 3.84 Mcps TDD system.
Figure 3:
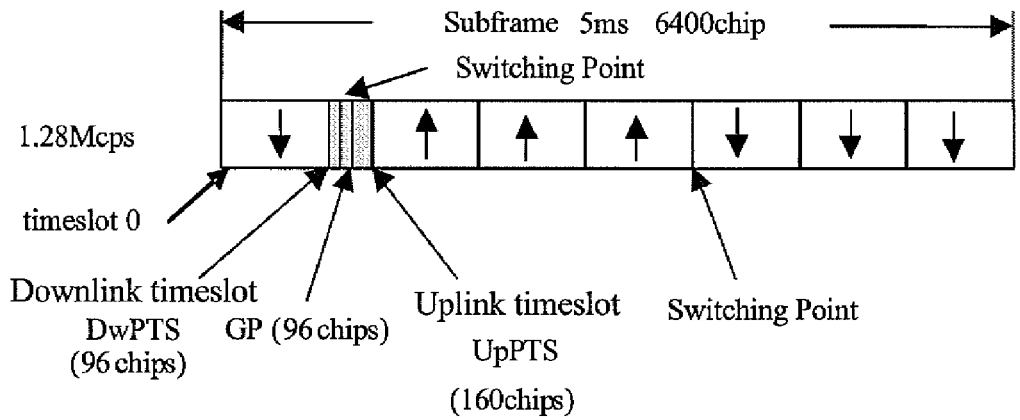
FIG. 3 is a schematic diagram illustrating the subframe structure of the conventional 1.28 Mcps TDD system.
Figure 4:
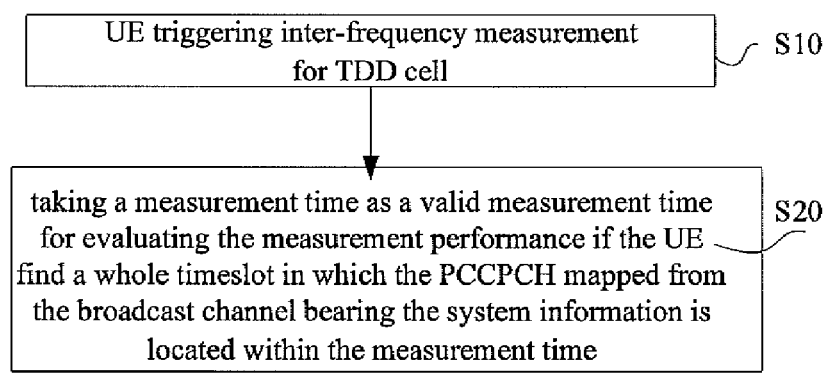
FIG. 4 is a flow chart illustrating the main implementation principle of the method for determining the measurement time of inter-frequency measurement according to an embodiment of the invention.

Hereinafter the principle of the invention and the embodiments thereof will be described in detail with reference to the accompanying drawings. FIG. 4 shows a flow chart illustrating the main implementation principle of the method for determining the measurement time of inter-frequency measurement according to an embodiment of the invention, including the following steps:

At step S10, the dual mode UE supporting WCDMA FDD mode and WCDMA TDD mode in the FDD mode triggers inter-frequency measurement for the TDD cell; when the UE is in CELL_FACH state, the inter-frequency measurement for the TDD cell is triggered according to the system information and cell receiving quality; when the UE is in CELL_DCH state, the inter-frequency measurement for the TDD cell is triggered according to the measurement control information sent by the system.

At step S20, if a whole timeslot in which the PCCPCH mapped from the broadcast channel bearing the system information is located is found within the measurement time, the measurement time is taken as the valid measurement time for evaluating the measurement performance.

From the above process, such a problem may be avoided that when the UE supporting WCDMA FDD mode and WCDMA TDD mode in the FDD mode performs inter-frequency measurement to the TDD cell, the evaluated measurement performance is inaccurate because the measurement time calculated according to formula 1 or indicated by the compression mode sent from the UTRAN is directly used as the valid measurement time while not considering the frame structure of the TDD system.

Hereinafter, the embodiments of the invention will be described when the dual mode UE supporting WCDMA FDD mode and WCDMA TDD mode is respectively in CELL_FACH state and in CELL_DCH state.

Figure 5:
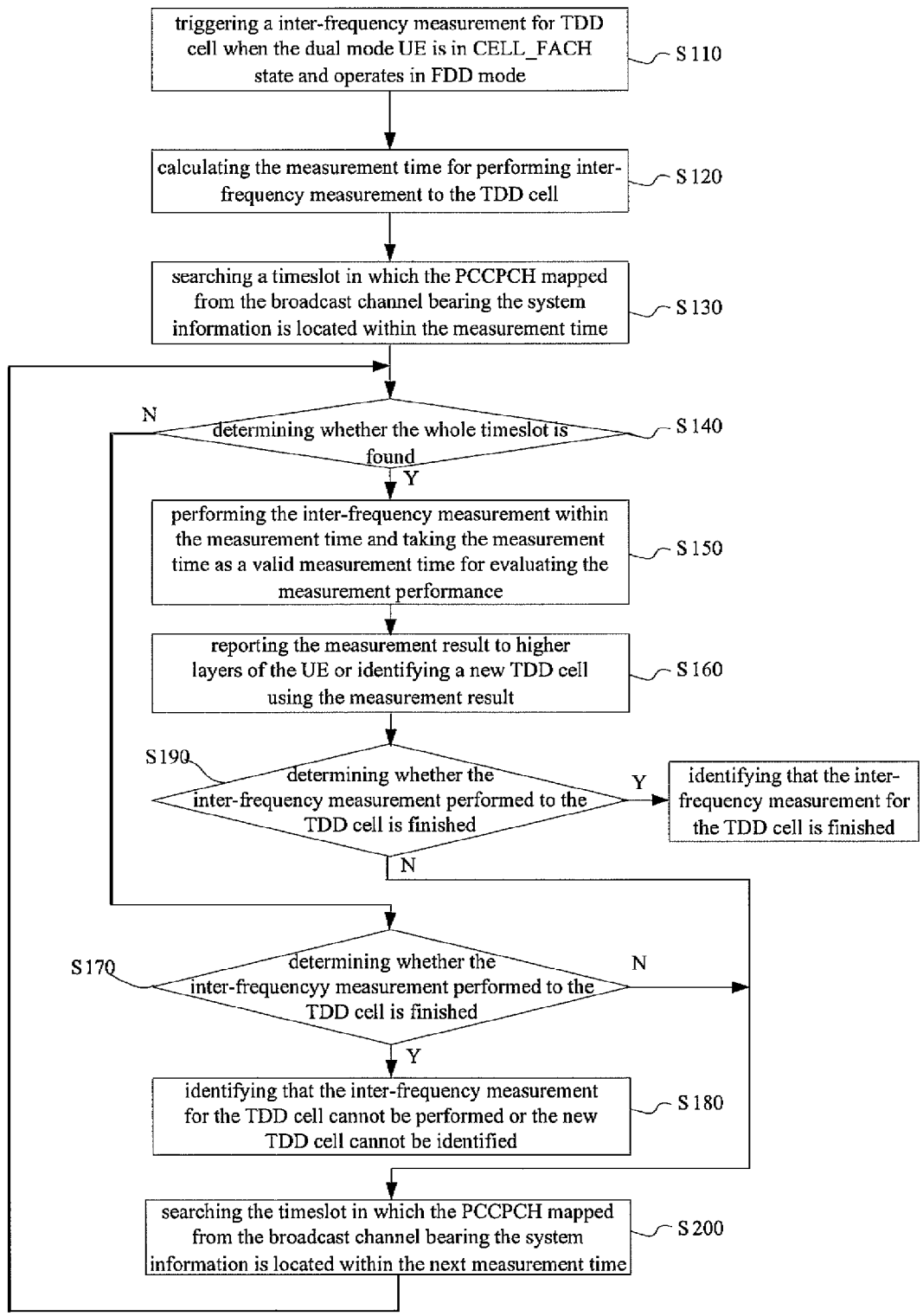
FIG. 5 is a flow chart illustrating an embodiment of the invention when the principle of the invention is applied to a dual mode UE in CELL_FACH state.

FIG. 5 shows a flow chart illustrating an embodiment of the invention when the principle of the invention is applied to a dual mode UE in CELL_FACH state, and the implementation is as follows.

At step S110, the dual mode UE supporting WCDMA FDD mode and WCDMA TDD mode in CELL_FACH state and operating in the FDD mode triggers the inter-frequency measurement for the TDD cell according to the system information and the cell receiving quality.

At step S120, the dual mode UE calculates the measurement time for performing inter-frequency measurement to the TDD cell according to the following formula (i.e. the Formula 1):

$$SFN = (C\_RNTI \bmod M\_REP + n \times M\_REP) \times N$$

The dual mode UE performs inter-frequency measurement in a frame whose SFN satisfies the above-mentioned formula;

N represents Transmission Timing Interval (TTI) of the FACH with the maximal TTI on a Secondary Common Control Physical Channel (SCCPCH) bearing non-MBMS logical channel monitored by the dual mode UE being divided by 10 ms;

M_REP represents the measurement interval cycle period, $M\_REP = 2^k$; and the repeat period of the measurement time for N frames is N×M_REP frames, wherein k is the FACH Measurement interval cycle period coefficient read from the FACH measurement interval information contained in the system information 11 or 12;

Cell Radio Network Temporary Identity (C_RNTI) represents the C_RNTI value of the dual mode UE;

n=0, 1, 2 ..., as long as the SFN is less than its maximum value.

If the UE receives the MBMS PTM service, it will interrupt the measurement to ensure the demodulation performance of the received MBMS, so that the measurement time will not reach the calculated measurement time.

At step S130, the dual mode UE searches the timeslot in which the PCCPCH mapped from the broadcast channel bearing the system information is located within the calculated measurement time. The specific search process has been definitely described in specification 3GPP TS 25.224, and the unnecessary details will not be given herein any more.

At step S140, the dual mode UE determines whether the timeslot can be found. If the timeslot can be found, performs step S150; otherwise, performs step S170.

At step S150, the dual mode UE performs inter-frequency measurement to the TDD cell within the calculated measurement time, and takes the calculated measurement time as the valid measurement time for evaluating the measurement performance, i.e. the measurement time in which the whole timeslot is found is taken as the valid measurement time or the number of the valid measurement is accumulated as a time input parameter for evaluating the measurement performance subsequently.

At step S160, within the measurement time according to the performance requirement, the physical layer of the dual mode UE reports the measurement result obtained by performing inter-frequency measurement to the TDD cell to the higher layers of the UE; or identifies the new TDD cell according to the measurement result obtained by performing inter-frequency measurement to the TDD cell; and then proceeds to step S190.

At step S170, the dual mode UE determines whether the process of the inter-frequency measurement performed to the TDD cell is finished. If the process is finished, performs step 180; otherwise, performs step S200.

At step S180, the dual mode UE identifies that the inter-frequency measurement for the TDD cell cannot be performed; or the new TDD cell cannot be identified by performing inter-frequency measurement to the TDD cell.

At step S190, the dual mode UE determines whether the process of the inter-frequency measurement performed to the TDD cell is finished. If the process is finished, the dual mode UE identifies that the inter-frequency measurement for the TDD cell is finished; otherwise, proceeds to step S200.

At step S200, the dual mode UE continues searching the timeslot in which the PCCPCH mapped from the broadcast channel bearing the system information is located within the next measurement time calculated according to the above-mentioned formula (i.e. the Formula 1), then proceeds to step S140.

In addition, in the case of not taking the current measurement time as the valid measurement time, if the dual mode UE determines that the process of the inter-frequency measurement performed to the TDD cell is finished, and the UE did not find the valid measurement time during the process, the dual mode UE identifies that the inter-frequency measurement for the TDD cell cannot be performed; or the new TDD cell cannot be identified by performing inter-frequency measurement to the TDD cell.

In the case of not taking the current measurement time as the valid measurement time, if the dual mode UE determines that the process of the inter-frequency measurement performed to the TDD cell is finished, and the UE found the valid measurement time during the previous process, the dual mode UE identifies that the inter-frequency measurement performed to the TDD cell is finished.

In the case of not taking the current measurement time as the valid measurement time, if the dual mode UE determines that the process of the inter-frequency measurement performed to the TDD cell is not finished, the UE searches the timeslot in which the PCCPCH mapped from the broadcast bearing the system information is located within the next measurement time, and repeats the above-mentioned process.

Figure 6:
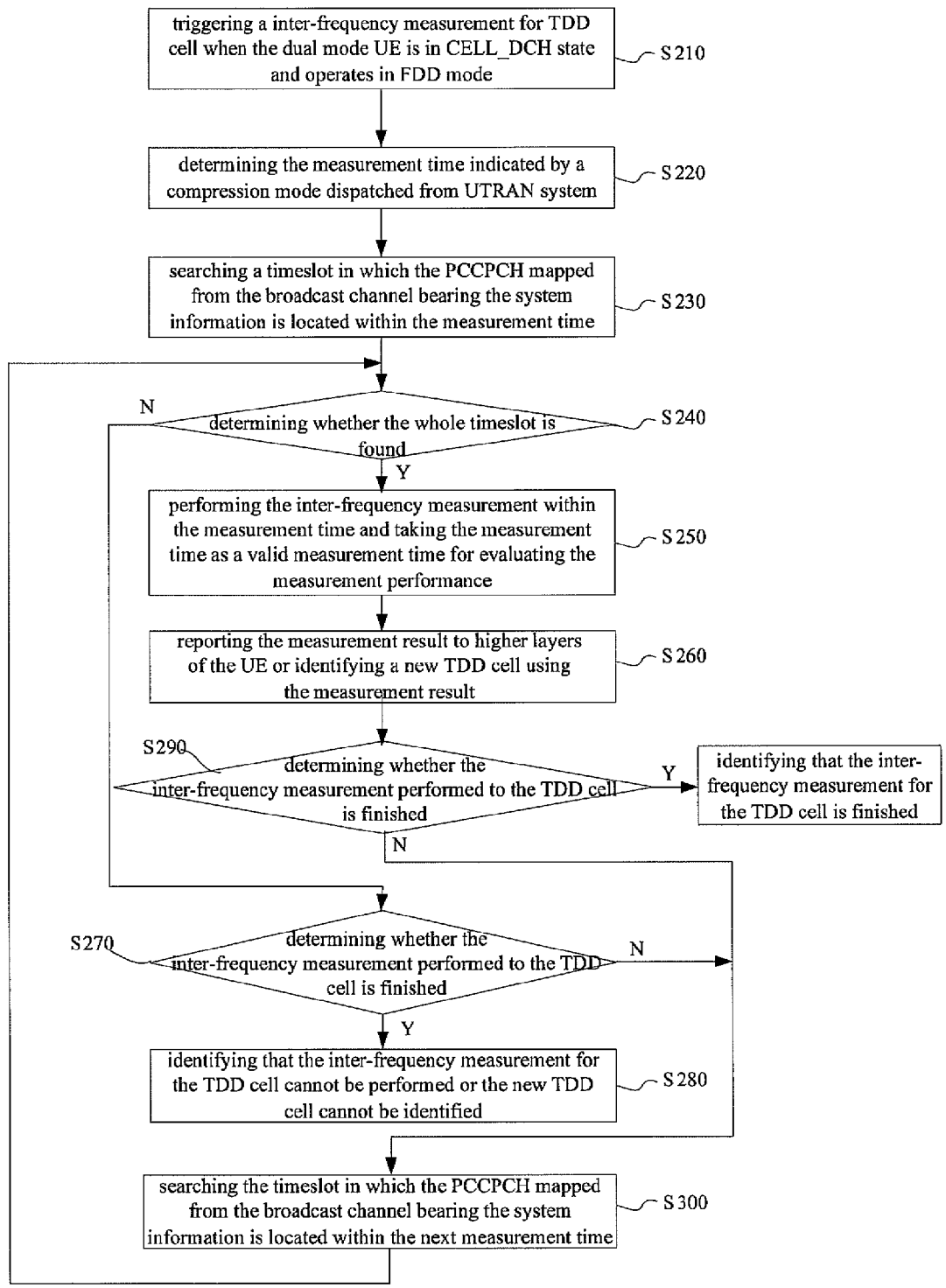
FIG. 6 is a flow chart illustrating an embodiment of the invention when the principle of the invention is applied to a dual mode UE in CELL_DCH state.

FIG. 6 shows a flow chart illustrating that the principle of the invention is applied to the dual mode UE in CELL_DCH state, and the implementations are as follows.

At step S210, the dual mode UE supporting WCDMA FDD mode and WCDMA TDD mode in CELL_DCH state and operating in the FDD mode triggers the inter-frequency measurement for the TDD cell according to the measurement control information sent from the UTRAN system.

At step S220, the dual mode UE determines the measurement time for performing inter-frequency measurement for the TDD cell according to the measurement time indicated by the compression mode sent from the UTRAN system.

At Step S230, the dual mode UE searches the timeslot in which the PCCPCH mapped from the broadcast channel bearing the system information is located within the calculated measurement time, the specific search process has been definitely described in specification 3GPP TS 25.224, and the unnecessary details will not be given herein any more.

At step S240, the dual mode UE determines whether the timeslot can be found, if the timeslot can be found, performs step S250; otherwise, performs step S270.

At step S250, the dual mode UE performs inter-frequency measurement to the TDD cell within the measurement time indicated by the compression mode sent from the UTRAN, and takes the measurement time indicated by the compression mode sent from the UTRAN as the valid measurement time for evaluating the measurement performance, i.e. the measurement time in which the found whole timeslot is located is taken as the valid measurement time or the number of the valid measurement is accumulated as a time input parameter for evaluating the measurement performance subsequently.

At step S260, within the required measurement time performance, the physical layer of the dual mode UE reports the measurement result obtained by performing inter-frequency measurement to the TDD cell to higher layers of the UE; or identifies a new TDD cell according to the measurement result obtained by performing inter-frequency measurement to the TDD cell; then proceeds to step S290.

At step S270, the dual mode UE determines whether the process of the inter-frequency measurement performed to the TDD cell is finished. If the process is finished, performs step S280; otherwise, performs step S300.

At step S280, the dual mode UE identifies that the inter-frequency measurement for the TDD cell cannot be performed; or the new TDD cell cannot be identified by performing inter-frequency measurement to the TDD cell.

At step S290, the dual mode UE determines whether the process of the inter-frequency measurement performed to the TDD cell is finished. If the process is finished, the dual mode UE identifies that the inter-frequency measurement for the TDD cell is finished; otherwise, proceeds to step S300.

At step S300, the dual mode UE continues searching the timeslot in which the PCCPCH mapped from the broadcast channel bearing the system information is located within the next measurement time indicated by the compression mode sent from the UTRAN, then proceeds to step S240.

In addition, in the case of not taking the current measurement time as the valid measurement time, if the dual mode UE determines that the process of the inter-frequency measurement performed to the TDD cell is finished, and the UE did not find the valid measurement time during the previous process, the dual mode UE identifies that the inter-frequency measurement for the TDD cell cannot be performed; or the new TDD cell cannot be identified by performing inter-frequency measurement to the TDD cell.

In the case of not taking the current measurement time as the valid measurement time, if the dual mode UE determines that the process of the inter-frequency measurement performed to the TDD cell is finished, and the UE found the valid measurement time during the previous process, the dual mode UE identifies that the inter-frequency measurement performed to the TDD cell is finished.

In the case of not taking the current measurement time as the valid measurement time, if the dual mode UE determines that the process of the inter-frequency measurement performed to the TDD cell is not finished, the UE searches the timeslot in which the PCCPCH mapped from the broadcast bearing the system information is located within the next measurement time, and repeat the above-mentioned process.

It is obvious that in the case that the dual mode UE supporting WCDMA FDD mode and WCDMA TDD mode in the FDD operation mode performs inter-frequency measurement to the TDD cell, only when the whole timeslot in which the PCCPCH mapped from the broadcast channel bearing system information is located can be found within the measurement time calculated through the above-mentioned Formula 1 or within the measurement time indicated by the compression mode sent from the UTRAN, the measurement time calculated through the above-mentioned Formula 1 or the measurement time indicated by the compression mode sent from the UTRAN may be taken as the valid measurement time. Therefore, the process of evaluating the measurement performance by using the valid measurement time as time input parameter may become creditable, and the accuracy for evaluating the measurement performance may be greatly improved.

Figure 7:
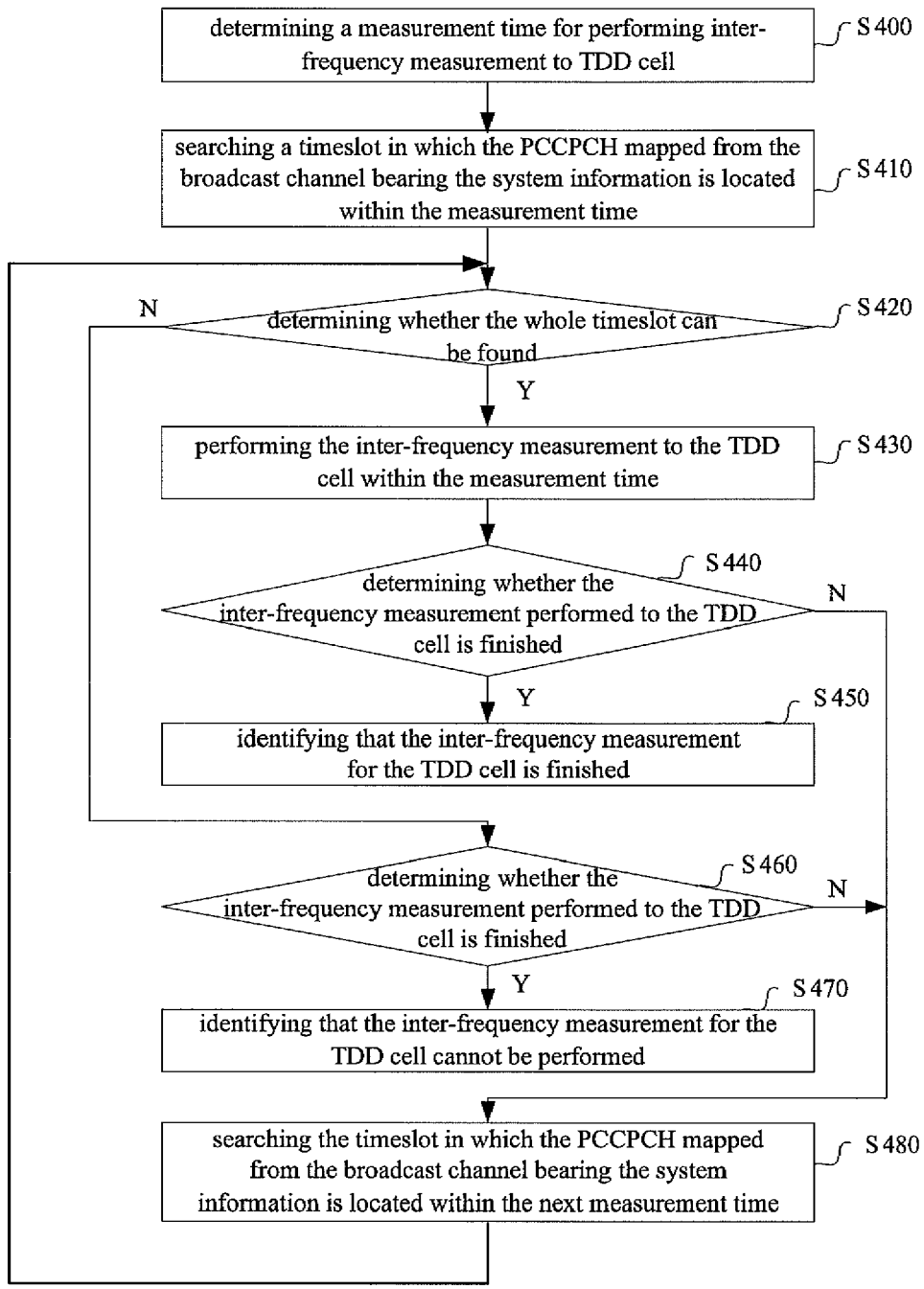
FIG. 7 is a flow chart illustrating the implementation of the inter-frequency measurement method according to an embodiment of the invention.

Accordingly, an embodiment of the invention also provides an inter-frequency measurement method for a dual mode UE supporting FDD mode and TDD mode to perform inter-frequency measurement to the TDD cell. FIG. 7 shows a flow chart illustrating the main implementation of the inter-frequency measurement method according to an embodiment of the invention, and the main implementations are as follows.

At step 400, the measurement time for performing inter-frequency measurement to the TDD cell is determined.

When the dual mode UE is in CELL_FACH state, the measurement time is calculated according to the following formula:

$$SFN=(C\_RNTI \bmod M\_REP+n \times M\_REP) \times N$$

In which:
the dual mode UE performs inter-frequency measurement in a frame whose SFN satisfies the above-mentioned formula;
N represents TTI of the FACH with the maximal TTI on a SCCPCH bearing non-MBMS logical channel monitored by the dual mode UE being divided by 10 ms;
M_REP represents the measurement interval cycle period, $M\_REP=2^k$; and the repeat period of the measurement time for N frames is N×M_REP frames, wherein k is the FACH Measurement interval cycle period coefficient read from the FACH measurement interval information contained in the system information 11 or 12;
C_RNTI represents the C_RNTI value of the dual mode UE;
n=0, 1, 2 . . . , as long as the SFN is less than its maximum value.

If the UE receives the MBMS PTM service, it will interrupt the measurement to ensure the demodulation performance of the received MBMS, so that the actual measurement time will not reach the calculated measurement time.

When the UE is in CELL_DCH state, the measurement time is determined by the compression mode sent from the UTRAN.

At step S410, the dual mode UE searches the timeslot in which the PCCPCH mapped from the broadcast channel bearing the system information is located within the measurement time.

At step S420, the dual mode UE determines whether the whole timeslot can be found, if the timeslot can be found, performs step S430; otherwise, performs step S460.

At step S430, the dual mode UE performs inter-frequency measurement to the TDD cell within the determined measurement time.

At step S440, the dual mode UE determines whether the process of the inter-frequency measurement performed to the TDD cell is finished, if the process is finished, performs step 450; otherwise, performs step S480.

At step S450, the dual mode UE determines whether the process of the inter-frequency measurement performed to the TDD cell is finished; and within the measurement time determined at step S400, the physical layer of the dual mode UE reports the result of the inter-frequency measurement performed to the TDD cell to the upper layers of the UE; or identifies a new TDD cell using the result of the inter-frequency measurement performed to the TDD cell.

At step S460, the dual mode UE determines whether the process of the inter-frequency measurement performed to the TDD cell is finished, if the process is finished, performs step 470; otherwise, performs step S480.

At step S470, the dual mode UE identifies the inter-frequency measurement for the TDD cell cannot be performed.

At step S480, the dual mode UE searches the timeslot in which the PCCPCH mapped from the broadcast channel bearing the system information is located within the next measurement time, then proceeds to step S420.

In addition, in the case of not taking the current measurement time as the valid measurement time, if the dual mode UE determines that the process of the inter-frequency measurement performed to the TDD cell is finished, and the UE did not find the valid measurement time during the previous process, the dual mode UE identifies that the inter-frequency measurement for the TDD cell cannot be performed; or the new TDD cell cannot be identified by performing inter-frequency measurement to the TDD cell.

In the case of not taking the current measurement time as the valid measurement time, if the dual mode UE determines that the process of the inter-frequency measurement performed to the TDD cell is finished, and the UE found the valid measurement time during the previous process, the dual mode UE identifies that the inter-frequency measurement performed to the TDD cell is finished.

In the case of not taking the current measurement time as the valid measurement time, if the dual mode UE determines that the process of the inter-frequency measurement performed to the TDD cell is not finished, the UE searches the timeslot in which the PCCPCH mapped from the broadcast bearing the system information is located within the next measurement time, and repeats the above-mentioned process.

It is obvious that, in the FDD operation mode, if the dual mode LYE supporting WCDMA FDD mode and WCDMA TDD mode performs an inter-frequency measurement to the TDD cell, only when the whole timeslot is found within the measurement time calculated through the above-mentioned Formula 1 or within the measurement time indicated by the compression mode sent from the UTRAN, the PCCPCH mapped from the broadcast channel bearing system information being located in the timeslot, the inter-frequency measurement is performed to the TDD cell within the measurement time calculated through the above-mentioned Formula 1 or within the measurement time indicated by the compression mode sent from the UTRAN. Therefore, the inter-frequency measurement performed to the TDD cell by the dual mode UE in FDD mode may become creditable, and the result of the measurement may be ensured.

An element for determining measurement time of inter-frequency measurement according to an embodiment of the invention is used for a dual mode UE supporting FDD mode and TDD mode to perform inter-frequency measurement for a TDD cell, including: a measurement time determining unit for determining the measurement time when the UE is triggered to perform the inter-frequency measurement to the TDD cell; and a valid measurement time determining unit, for taking the measurement time as the valid measurement time for evaluating the measurement performance if the whole timeslot in which the PCCPCH mapped from the broadcast channel bearing the system information is located can be found within the measurement time.

The element also includes: a timeslot searching and determining unit, for searching the timeslot in which the PCCPCH mapped from the broadcast channel bearing the system information is located and determining whether the whole timeslot can be found and then informing the valid measurement time determining unit if the timeslot can be found.

When the UE is in CELL_FACH state, the measurement time determining unit determines the frame whose SFN satisfies the following formula as the measurement time.

$$SFN = (C\_RNTI \bmod M\_REP + n \times M\_REP) \times N$$

In which: N represents TTI of the FACH with the maximal TTI on a SCCPCH bearing non-MBMS logical channel monitored by the UE being divided by 10 ms;

M_REP represents the measurement interval cycle period, $M\_REP = 2^k$ and the repeat period of the measurement time for N frames is N×M_REP frames, wherein k is the FACH Measurement interval cycle period coefficient read from the FACH measurement interval information contained in the system information 11 or 12;

C_RNTI represents the C_RNTI value of the UE;

n=0, 1, 2 . . . , as long as the SFN is less than its maximum value.

When the UE is in CELL_DCH state, the measurement time determining unit determines the measurement time by the compression mode sent from the UTRAN.

While the invention has been illustrated and described with reference to some preferred embodiments, the invention is not limited to these. Those skilled in the art should recognize that various variations and modifications can be made without departing from the spirit and scope of the invention as defined by the accompanying claims.

What is claimed is:

1. A method for determining a valid measurement time of an inter-frequency measurement, used by a User Equipment supporting a Frequency Division Duplex mode and a Time Division Duplex mode, said User Equipment being in the Frequency Division Duplex mode performing the inter-frequency measurement for a Time Division Duplex cell in a mobile communication system, comprising:

triggering the inter-frequency measurement for the Time Division Duplex cell;

determining a measurement time for the inter-frequency measurement; and determining the valid measurement time within the measurement time for evaluating a measurement performance;

wherein the valid measurement time comprises a whole timeslot, and a Primary Common Control Physical Channel bearing system information is located in the timeslot.

2. The method according to claim 1, wherein the inter-frequency measurement for the Time Division Duplex cell is trigged according to the system information and cell receiving quality when the User Equipment is in a CELL_FACH state.

3. The method according to claim 1, wherein the inter-frequency measurement for the Time Division Duplex cell is triggered according to measurement control information sent by the mobile communication system when the User Equipment is in a CELL_DCH state.

4. The method according to claim 1, further comprising, between triggering the inter-frequency measurement and determining the valid measurement time:

Searching for the timeslot within the measurement time where the Primary Common Control Physical Channel is located in the whole timeslot; and determining whether the timeslot is found.

5. The method according to claim 1, further comprising:

accumulating multiple obtained valid measurement times as a time parameter for evaluating the measurement performance.

6. The method according to claim 1, wherein, when the User Equipment is in a CELL_FACH state, the measurement time is determined as a frame, and wherein a System Frame Number (SFN) of the frame satisfies the following formula:

$$SFN = (C\_RNTI \bmod M\_REP + n \times M\_REP) \times N$$

where N represents the number of 10 ms frames of Transmission Timing Interval of a Forward Access Channel with a maximal Transmission Timing Interval on Secondary Common Control Physical Channel bearing non-MBMS logical channel monitored by the User Equipment;

M_REP represents the measurement interval cycle period, M_REP =2k, and a repeat period of the measurement time for N frames is N×M_REP frames, wherein k is the Forward Access Channel Measurement interval cycle period coefficient read from the Forward Access Channel measurement interval information contained in the system information 11 or 12;

C_RNTI represents the Cell Radio Network Temporary Identity value of the User Equipment; and n=0,1,2 . . . , as long as the SFN is less than a maximum value of the SFN.

7. The method according to claim 6, wherein an actually used measurement time is less than a calculated measurement time when the User Equipment is receiving a Multimedia Broadcast/Multicast Service Point to Multipoint service.

8. The method according to claim 1, wherein the measurement time is indicated by a compression mode sent from a Universal Terrestrial Radio Access Network when the User Equipment is in a CELL_DCH state.

9. A method for performing an inter-frequency measurement, used by a User Equipment supporting a Frequency Division Duplex mode and a Time Division Duplex mode, said User Equipment being in the Frequency Division Duplex mode performing the inter-frequency measurement for a Time Division Duplex cell, comprising:

determining a measurement time of the inter-frequency measurement for the Time Division Duplex cell;

searching a timeslot within the measurement time, wherein a Primary Common Control Physical Channel bearing system information is located in the timeslot; and performing the inter-frequency measurement for the Time Division Duplex cell within the measurement time in which the whole timeslot is found.

10. The method according to claim 9, wherein the inter-frequency measurement is performed repeatedly, and wherein the method further comprises, after each measurement, determining whether the process for performing the inter-frequency measurement for the Time Division Duplex cell is finished, if the process is finished, identifying that the inter-frequency measurement for the Time Division Duplex cell is finished; or if the process is not finished, searching a next timeslot within a next measurement time, wherein the Primary Common Control Physical Channel bearing system information is located in the timeslot, and performing the inter-frequency measurement for the Time Division Duplex cell within the next measurement time.

11. The method according to claim 9, further comprising:

if the timeslot is not found, determining whether the process for performing the inter-frequency measurement for the Time Division Duplex cell is finished, if the process is finished, identifying that the inter-frequency measurement for the Time Division Duplex cell is unable to be performed;

if the process is not finished, searching a next timeslot within a next measurement time, wherein the Primary Common Control Physical Channel bearing system information is located within the timeslot, and performing the inter-frequency measurement for the Time Division Duplex cell within the next measurement time in which the timeslot is found.

12. The method according to claim 9, wherein a valid measurement time is determined within the measurement time, and the method further comprises, if the timeslot is not found, determining whether the process for performing the inter-frequency measurement to for the Time Division Duplex cell is finished, if the process is finished and the valid measurement time has not been found, identifying that the inter-frequency measurement for the Time Division Duplex cell is unable to be performed; and if the process is finished and the valid measurement time has been found, identifying that the inter-frequency measurement for the Time Division Duplex cell is finished;

if the process is not finished, searching the timeslot in which the Primary Common Control Physical Channel is located within the next measurement time, determining the timeslot as the valid measurement time, and repeating performing the inter-frequency measurement for the Time Division Duplex cell within the measurement time in which the timeslot is found.

13. The method according to claim 9, wherein the process of performing the inter-frequency measurement for the Time Division Duplex cell further comprises:

reporting a result of the inter-frequency measurement for the Time Division Duplex cell to upper layers of the User Equipment within the measurement time; or, identifying a new Time Division Duplex cell according to the result of the inter-frequency measurement performed to the Time Division Duplex cell.

14. The method according to claim 9, wherein the measurement time is determined as a frame when the User Equipment is in a CELL_FACH state, wherein a System Frame Number (SFN) of the frame satisfies the following formula:

$$SFN=(C\_RNTI \bmod M\_REP+n\times M\_REP)\times N$$

where N represents the number of 10 ms frames of Transmission Timing Interval of the Forward Access Channel with a maximal Transmission Timing Interval on Secondary Common Control Physical Channel bearing non-MBMS logical channel monitored by the User Equipment;

M_REP represents the measurement interval cycle period, M_REP=2k, and a repeat period of the measurement time for N frames is N×M_REP frames, wherein k is the Forward Access Channel Measurement interval cycle period coefficient read from the Forward Access Channel measurement interval information contained in the system information 11 or 12;

C_RNTI represents the Cell Radio Network Temporary Identity value of the User Equipment; and n=0,1,2 . . . , as long as the SFN is less than its maximum value.

15. The method according to claim 14, wherein an actual measurement time is less than a calculated measurement time when the User Equipment is receiving a Multimedia Broadcast/Multicast Service Point to Multipoint service.

16. The method according to claim 9, wherein the measurement time is determined by a compression mode sent from a Universal Terrestrial Radio Access Network when the User Equipment is in a CELL_DCH state.

17. An element for determining measurement time of an inter-frequency measurement, used by a User Equipment supporting a Frequency Division Duplex mode and a Time Division Duplex mode, said User equipment being in the Frequency Division Duplex mode performing the inter-frequency measurement for a Time Division Duplex cell, comprising:

a measurement time determining unit, configured to determine a measurement time when the User Equipment is triggered to perform the inter-frequency measurement for the Time Division Duplex cell; and a valid measurement time determining unit, configured to take the measurement time as the valid measurement time for evaluating the measurement performance if a timeslot is found within the measurement time, and a Primary Common Control Physical Channel is located in the whole timeslot.

18. The element according to claim 17, further comprising:

a timeslot searching and determining unit, configured to search the timeslot within the measurement time, the Primary Common Control Physical Channel being located in the timeslot, and determine whether the whole timeslot is found and then inform the valid measurement time determining unit if the timeslot is found.

19. The element according to claim 17, wherein the measurement time determining unit determines a frame as the measurement time when the User Equipment is in a CELL_FACH state, wherein a System Frame Number (SFN) of the frame satisfies the following formula:

$$SFN=(C\_RNTI \bmod M\_REP + n \times M\_REP) \times N$$

where N represents the number of 10 ms frames of Transmission Timing Interval of the Forward Access Channel with a maximal Transmission Timing Interval on Secondary Common Control Physical Channel bearing non-MBMS logical channel monitored by the User Equipment;

M_REP represents the measurement interval cycle period, M_REP=2k and a repeat period of the measurement time for N frames being N×M_REP frames, wherein k is the Forward Access Channel Measurement interval cycle period coefficient read from the Forward Access Channel measurement interval information contained in the system information 11 or 12;

C_RNTI represents the Cell Radio Network Temporary Identity value of the User Equipment; and n=0,1,2 . . . , as long as the SFN is less than a maximum value of the SFN.

20. The element according to claim 17, wherein when the User Equipment is in a CELL_DCH state, the measurement time determining unit is configured to determine the measurement time by a compression mode sent from a Universal Terrestrial Radio Access Network.

* * * * *